United States Patent
McIntyre et al.

[11] Patent Number: 5,722,110
[45] Date of Patent: Mar. 3, 1998

[54] PORTABLE INDUSTRIAL VACUUM MACHINE

[75] Inventors: Paul Curtis McIntyre, 4742 Squirrel Nest La., Charlotte, N.C. 28227; Frank Rene Gruber, Monroe, N.C.

[73] Assignee: Paul Curtis McIntyre, Charlotte, N.C.

[21] Appl. No.: 541,459

[22] Filed: Oct. 10, 1995

[51] Int. Cl.⁶ .................. A47L 5/28; A47L 5/32
[52] U.S. Cl. .................. 15/329; 15/327.5; 15/344; 15/377; 15/410; 15/412
[58] Field of Search .................. 15/344, 329, 412, 15/410

[56] References Cited

U.S. PATENT DOCUMENTS

| | | | |
|---|---|---|---|
| 1,737,855 | 12/1929 | Kux | 15/354 X |
| 2,219,810 | 10/1940 | Foss | 15/329 |
| 2,456,639 | 12/1948 | Lanter | 15/329 X |
| 3,862,469 | 1/1975 | Burgeon . | |
| 4,121,915 | 10/1978 | Anderson . | |
| 4,467,494 | 8/1984 | Jones . | |
| 4,578,840 | 4/1986 | Pausch . | |
| 4,723,971 | 2/1988 | Caldas . | |
| 5,294,063 | 3/1994 | Bote | 15/344 X |
| 5,524,321 | 6/1996 | Weaver et al. | 15/329 |

*Primary Examiner*—Chris K. Moore
*Attorney, Agent, or Firm*—Kilpatrick Stockton LLP

[57] ABSTRACT

The present invention involves an industrial vacuum cleaner system for the collection of large debris in industrial settings, said vacuum capable of being mounted on a wheeled frame and being carried manually. The system has a vacuum unit having an impeller housing, an impeller disposed within the impeller housing, a motor housing attached to the impeller housing, and a motor disposed within the motor housing. The system has a handle affixed to said vacuum unit, means for detachably attaching the vacuum unit to said wheeled carriage, and means for gripping and carrying the vacuum unit by hand. The system has an improved impeller having a plurality of large vanes disposed on the forward side of the impeller and a plurality of smaller vanes disposed on the reverse side of the impeller. The system has an improved impeller housing assembly having en extension spacer which increases airflow through the impeller housing.

30 Claims, 8 Drawing Sheets

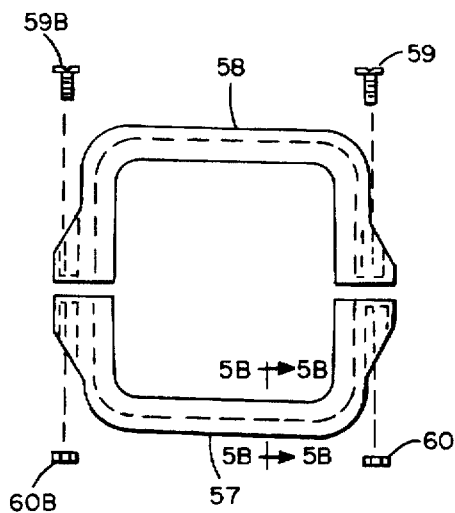
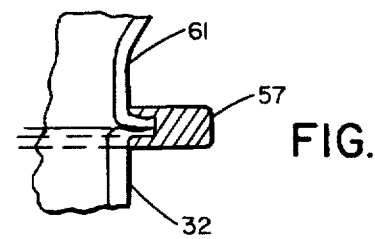
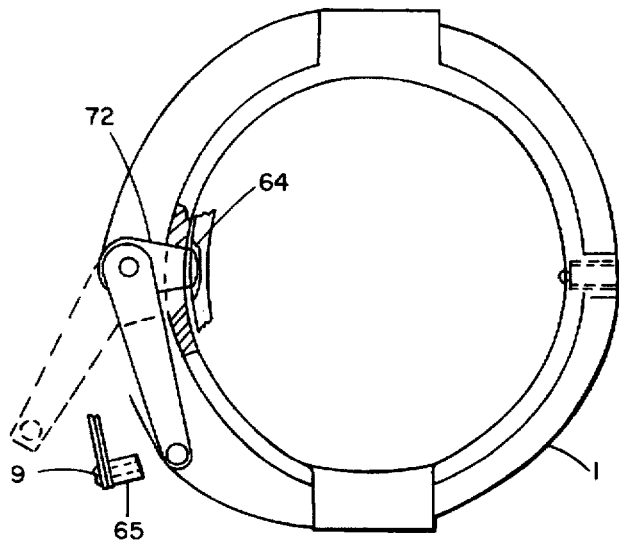
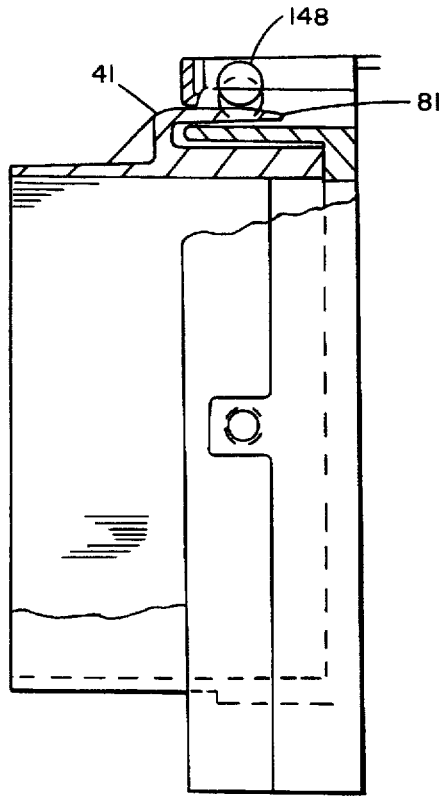
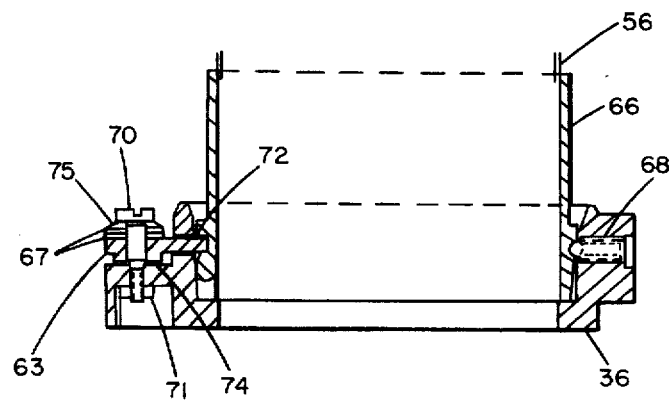
FIG. 5A
FIG. 5B
FIG. 6B
FIG. 6A
FIG. 6C

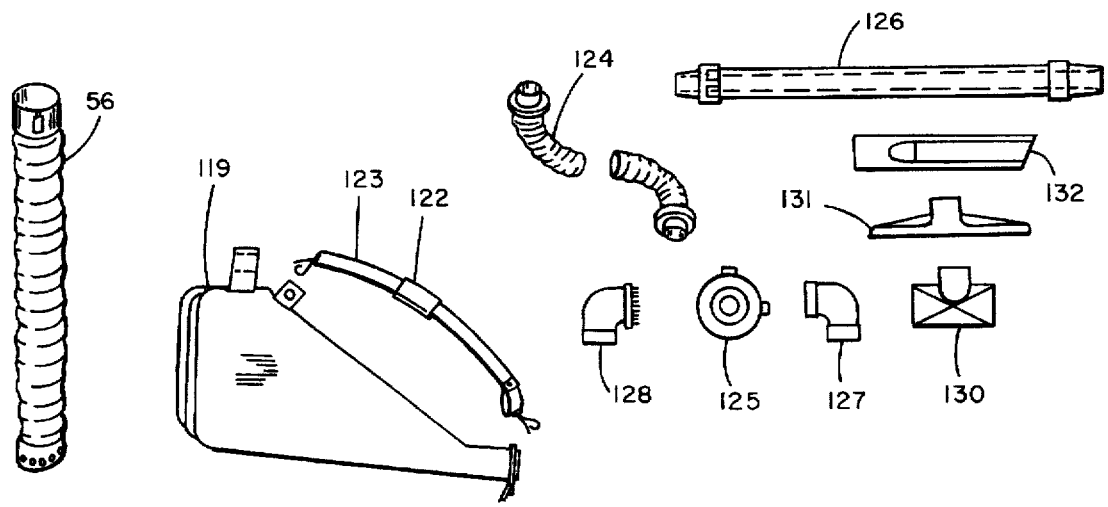
FIG. 7
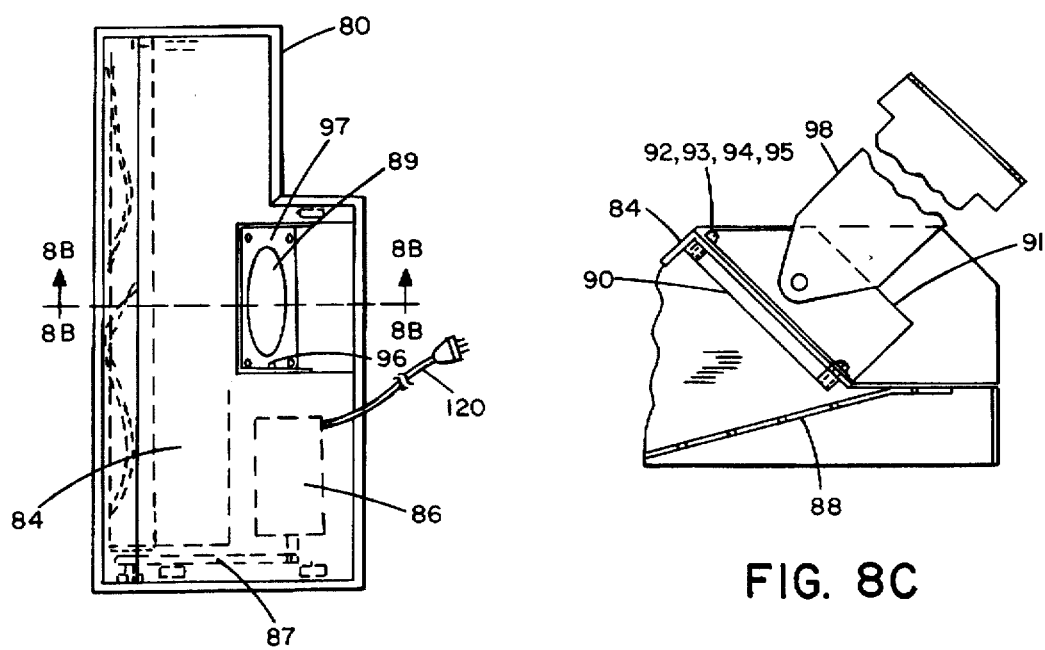
FIG. 8A
FIG. 8C

PORTABLE INDUSTRIAL VACUUM MACHINE

BACKGROUND OF THE INVENTION

1. Field of the Invention

The present invention relates to vacuum machines for use in removing and collecting particulate debris in an industrial setting. More particularly, the present invention relates to mobile and portable industrial vacuum machines which can be mounted on a movable cart or carried by the operator by means of a shoulder strap.

2. Description of the Related Art

Various types of industrial vacuum machines have been used for years for the purpose of cleaning particulate debris in industrial locations. Heavy-duty vacuum machines with large collection capacities are essential to cleaning and maintaining factories, parks, amusement parks, shopping centers, lumber yards, construction sites, hotels, convention halls, and other industrial locations. This is due not only to the fact that such sites often contain a great volume of discarded or unwanted particulate matter, but also because of the fact that in an industrial setting, the unwanted debris tends to be found in a great variety of shapes, sizes and constituent materials.

One is also likely to find a high level of dust, dirt and other fine particulate matter in the air at locations where an industrial vacuum machine is likely to be used. Therefore, it is essential that an industrial vacuum cleaner have a high quality reusable lint filter which may be easily removed, cleaned, and reinstalled.

Industrial locations are also characterized by the large area which must be cleaned. Vacuum cleaners for use in industrial settings must be sufficiently mobile to permit their use over a large area.

In light of the requirements of industrial settings, it is essential that persons desiring to clean such areas be equipped with a mobile, durable, high-capacity, sturdy vacuum cleaner capable of collecting debris of various sizes and shapes, and made of disparate materials. The industrial vacuum machine must have a powerful vacuum suction to be capable of collecting even heavy and bulky objects. Furthermore, considering the wide range of uses to which an industrial vacuum machine may be subjected, it should be highly adaptable to various operating conditions, terrains, and environments. Finally, the industrial vacuum machine should be easily cleanable.

Typically, industrial vacuum cleaners have been designed similar to the example illustrated in U.S. Pat. No. 4,723,971, which discloses an upright metal canister mounted on a wheeled frame. A vacuum pump or radial compressor is connected to the canister to create a vacuum effect. Debris is vacuumed into the canister through a flexible hose attached on the side of the canister. Debris is collected in a cloth bag disposed inside the canister.

Another typical industrial vacuum cleaner is disclosed in U.S. Pat. No. 4,467,494, which also comprises an upright metal canister connected to a vacuum pump.

A disadvantage of this type of industrial vacuum cleaner is its large, bulky design. Vacuum cleaners of such a design are also comparatively heavy due to the large metal cylinder which forms the receptacle for the debris. Due to their bulk and weight, vacuum machines of such design may also be difficult to maneuver over large areas such as factory floors, worksites and amusement parks.

Another disadvantage of this type of vacuum cleaner is the fact that it can only be used on relatively smooth surfaces over which its rollers can travel. Where a vacuum is required to be used over uneven or even rocky terrain, the vacuum cleaners disclosed in U.S. Pat. Nos. 4,467,494 and 4,723,971 would be difficult to use, since they cannot be easily maneuvered by means of their roller wheels.

It is, therefore, the general object of this invention to provide a heavy-duty mobile industrial vacuum machine for collecting industrial debris.

Another object of this invention is to provide a light-weight industrial vacuum machine which can be easily maneuvered over a large area.

A still further object of the present invention is to provide a vacuum machine which can be detachably mounted on a movable frame or carried by the operator by means of a shoulder strap when the vacuum machine must be used over uneven areas or other areas which would make maneuvering a wheeled cart difficult or unsafe. In keeping with this objective, it is desirable that the vacuum machine be easily detachable from the movable frame, and easily manipulated by an operator once attached to the shoulder strap.

Yet another object of this invention is to provide an industrial vacuum machine having an improved lint filter which can be installed without the necessity of fasteners, and which can be easily removed for cleaning. The present invention also provides redundant means for preventing lint and dust from entering the motor cavity.

Another object of this invention is to provide a novel clamp for attaching and connecting hoses, such as for attaching an output exhaust hose to a vacuum cleaner impeller housing.

A further object of the present invention is to provide an industrial vacuum cleaner having an improved impeller assembly.

The foregoing and other objects, advantages and features of this invention, and the manner in which the same are accomplished, will become more readily apparent upon consideration of the following detailed description of the invention taken in conjunction with the accompanying drawings, which illustrate preferred and exemplary embodiments of the invention.

SUMMARY OF THE INVENTION

The present invention involves an industrial vacuum cleaner system for the collection of large debris in industrial settings, said vacuum capable of being mounted on a wheeled frame and being carried manually. The system has a vacuum unit having an impeller housing, an impeller disposed within the impeller housing, a motor housing attached to the impeller housing, and a motor disposed within the motor housing. The system has a handle affixed to said vacuum unit, means for detachably attaching the vacuum unit to said wheeled carriage, and means for gripping and carrying the vacuum unit by hand.

For use in the system of the present invention, a portable vacuuming machine may be equipped with a shoulder strap which is easily attached to a bag and a handle bar hook. The strap length is adjusted with a buckle, allowing a comfortable way of adjusting the device for the individual operator and therefore allows ease in carrying the devise.

For use in the system of the present invention, the handle bar is provided with foam sleeves which allow the operator to handle the unit easily with two hands, one on the curved handle bar, and the other on an extended center handle. This allows orientation of the front of the unit for better control of the vacuuming hose.

The unit may also hang by itself at the operator's side, giving him or her the capability of using two hands to handle the vacuum pipe.

The portable unit can be attached to a separate, movable, rolling frame. Assembly of the unit to the frame may be accomplished by means of a single threaded knob. The vacuum unit is preferably keyed to the roller frame by means of a winged bracket which connects to the frame extension on the vacuum unit. The overall assembly is easy to couple and uncouple and the unit is compact and easy to handle. The unit is capable of accepting an assortment of tools and hose arrangements, allowing a thorough means of vacuuming large industrial areas in a three dimensional fashion with a relatively compact unit.

In a preferred embodiment, when the vacuum hose is removed, a grilled safety door closes the hose adapter apparatus and intercepts the motor control circuit by means of an integral latch. This also activates a microswitch roller. As the vacuum pipe adapters are removed, the microswitch breaks the motor controlled circuit and disables the motor.

The exhaust pipe and the frame are firmly secured together by two grooved clamps. The clamps fit the housing lip and the exhaust pipe together tightly due to a taper on the inner edge at the clamps and a pair of screws which sink into the clamp. Other basic safety features such as electrical grounding assure safe electrical insulation.

Another helpful improvement for protection against overheating of the motor is a new filter system comprising a single bell-shaped part. This part is preferably made of a perforated steel material which is formed to fit flush against the internal motor components such as the inner motor cap and the brush holder. However, the filter may also be made from an integral molded plastic mesh. The filter fits securely in place without fasteners. By removing the cap, the filter is easily accessible for cleaning purposes, and can be rapidly repositioned. The fine mesh design of the filter acts as a lint barrier, while allowing sufficient air flow to cool the running motor.

The area between the rear of the impeller and the edge of the inner housing face is important to the operation of the vacuum machine, as it is through this area that dust can escape from the impeller housing to the motor housing. The vacuum system of the present invention is preferably provided with a cylindrical edge on the rear of the impeller, which acts as barrier to dust entering the motor housing.

The vacuum machine of the present invention is preferably equipped with a linkage mechanism which controls the insertion and connection of the vacuum pipe or the grilled safety cover to the impeller housing. The linkage mechanism controls the positioning of the vacuum pipe and the means of connecting and retaining the vacuum pipe by means of a latch rotated by a lever. The linkage mechanism makes the latch extremely easy to operate, letting the operator support the inserted component with one hand while latching the inserted component with the other hand.

When the lever is opened, the link mechanism stays open by itself so that two hands can be used to insert the vacuum hose.

The foregoing and other features, aspects, and advantages of the present invention will become better understood with regard to the following description, appended claims, and accompanying drawings.

BRIEF DESCRIPTION OF THE DRAWINGS

FIG. 5A is a front elevation of the new clamp which couples the output exhaust hose onto the vacuum unit frame.

FIG. 5B is a section view of the clamp connecting the output exhaust hose to the vacuum unit frame.

FIG. 6A is a cross section of the of the edge of the flexible hose in contact with the frame of the vacuum unit.

FIG. 6B is a front view of the spring retaining mechanism which holds the flexible hose in place.

FIG. 6C is a cross section showing the flexible hose inserted into the frame of the vacuum unit.

FIG. 7 shows a profile of the large hose, the small hose, the accessories, the wand, and the zippered cloth dirt collection bag.

FIG. 8A is a plan view of the rug hose vacuum retainer assembly.

FIG. 8C is a sectional view of the retainer connection.

DETAILED DESCRIPTION OF THE PREFERRED EMBODIMENT

Figure 1:
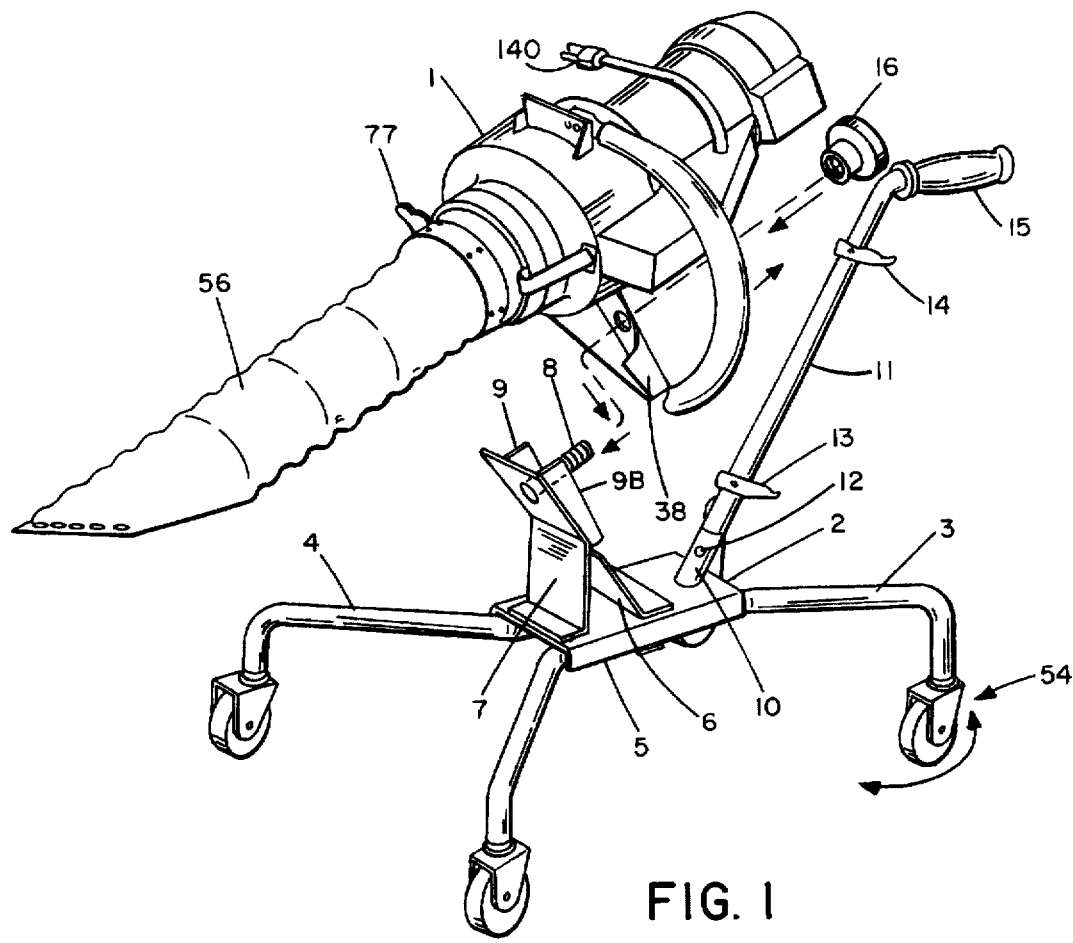
FIG. 1 is a perspective view showing the portable vacuum unit and the wheeled carriage.

FIG. 1 shows a portable vacuum unit 1 according to the present invention, equipped with a flexible vacuum hose 56, ready to be assembled onto the rolling four wheeled carriage 2. The portable vacuum unit is shown in detail on FIG. 2. The wheeled carriage 2 consists of a sturdy welded metal frame, made of two formed tubes 3 and 4, welded to a platform 5. At the four ends of the two tubes, 3 and 4 and a plastic swivel wheel assembly 54 is attached. On the platform 5, two metal brackets 6 and 7 are welded, which support a threaded stud 8 used to retain the vacuum unit 1, through a hole on the die cast frame extension 38 attached to the vacuum unit 1. Two wings 9 and 9B extending from the bracket 6, key the die cast extension 38 and prevent rotation of the vacuum unit 1 about the carriage 2. The two wings 9 and 9B precisely fit the inside of the die cast extension 38. In the rear of the carriage 2, a welded pipe 10 is affixed. The pipe 10 is tilted slightly. A tubular handle 11 is inserted into the pipe 10. The pipe 10 has a pre-drilled hole which is capable of receiving a spring snap 12 anchored in the tubular handle 11. The handle 11 may be removed by depressing the spring snap 12. The handle 11 has two hooked clamps 13 and 14 disposed around its diameter to support the collection bag 119 shown on FIG. 7. A rubber handle 15 is bonded to the tubular handle 11 to provide a good grip during operation. A threaded knob 16 is clamped to the threaded stud 8 extending from the metal bracket 7, which secures the vacuum unit 1 to the carriage 2.

Figure 2:
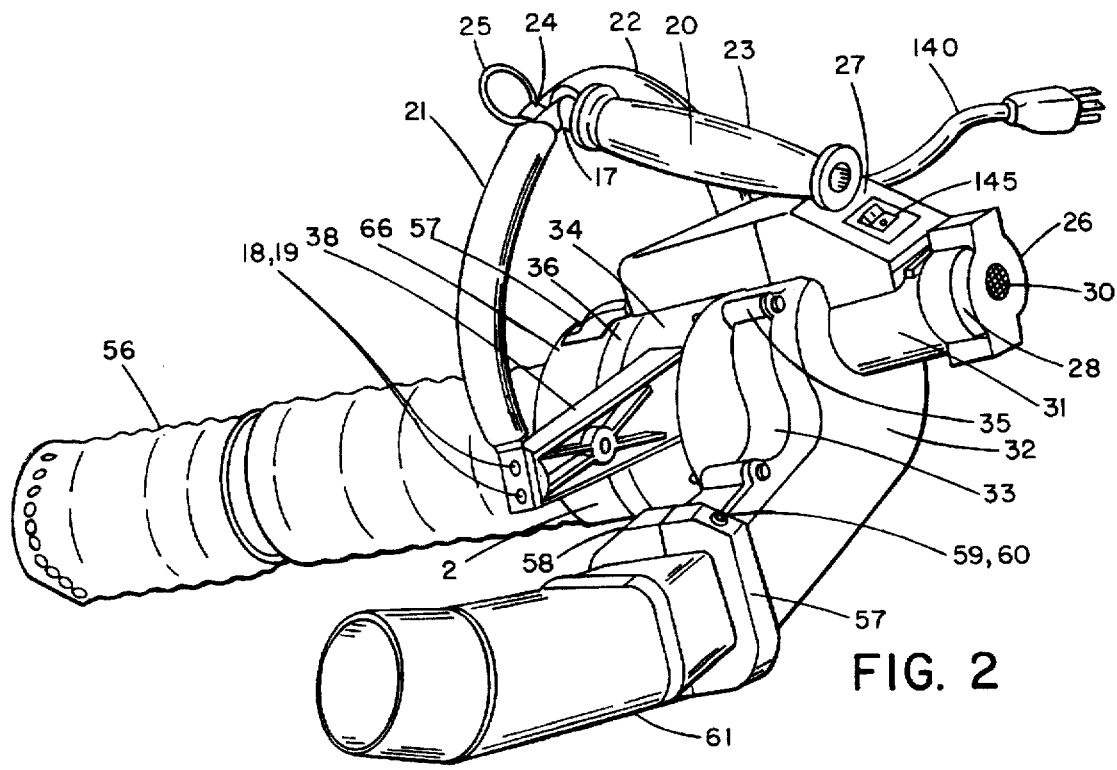
FIG. 2 is a perspective view showing the portable vacuum unit in detail.

FIG. 2 shows the system of the present invention in hand-held mode, and a means of gripping and carrying the unit during operation or transport.

A curved semicircular handle 17, made of curved metal tubing flattened at each end, is attached to the vacuum unit shown on FIG. 1. The ends of the curved handle 17 are pre-drilled to allow the handle 17 to be assembled onto the frame extension 38 of the impeller housing assembly 39 shown on FIG. 4F by two screws 18 and 19 at one end, and by two bolts, washers, and nuts at the other end (not shown).

Figure 3:
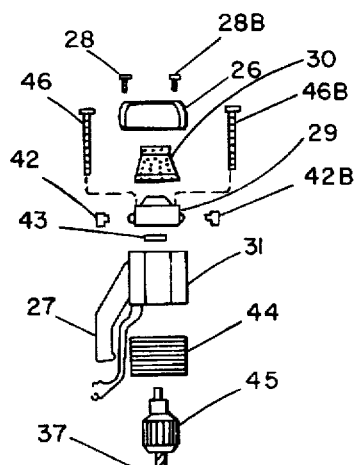
FIG. 3 is an exploded view showing the internal parts of the motor and impeller assemblies.
Figure 9A:
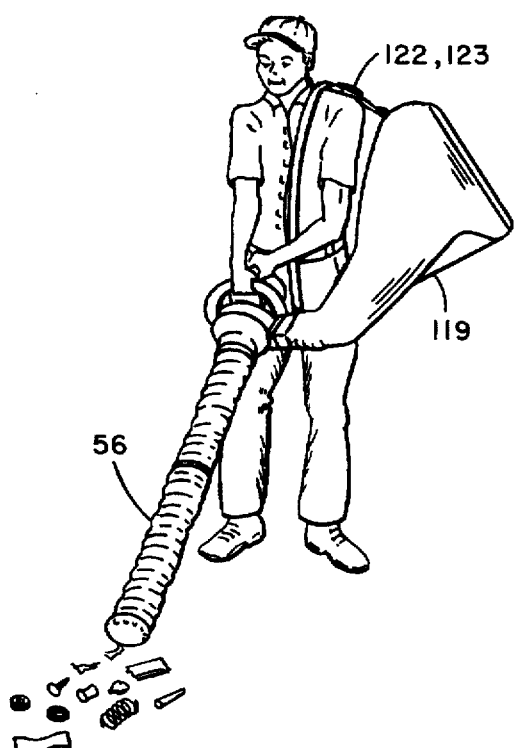
FIG. 9A shows the utilization of the large 4" diameter hose and the small 2½" diameter hose.
Figure 9B:
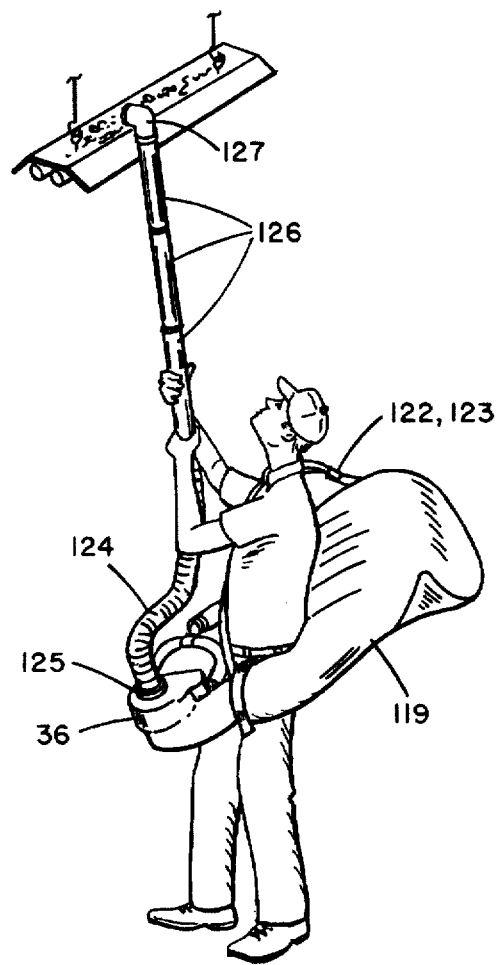
FIG. 9B shows the utilization of the small 2½" diameter hose.
Figure 9C:
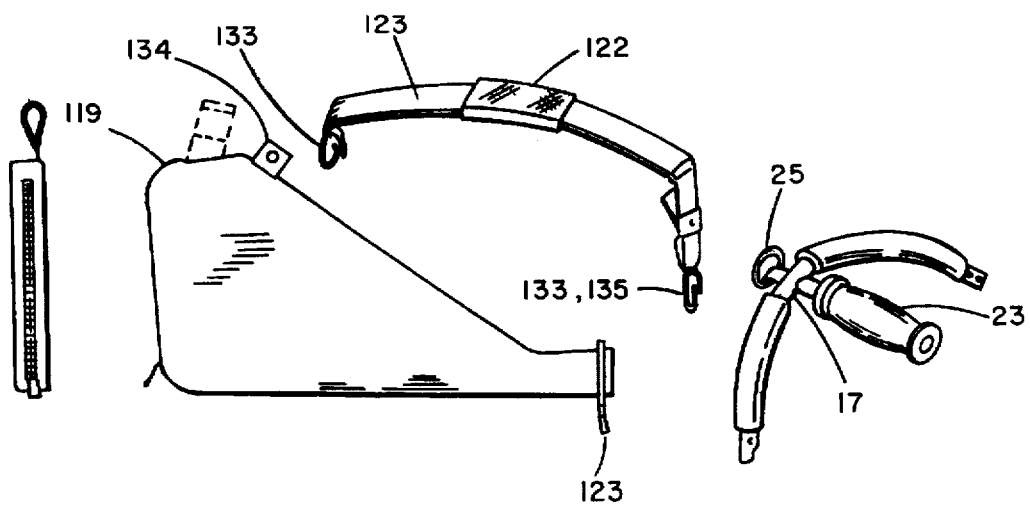
FIG. 9C shows the dirt collection bag, the shoulder strap and the handle.

A center handle bar 20 is welded perpendicularly in the center of the circular bar in order to allow the operator to handle the unit with two hands during operation. Two foam rubber pipes 21 and 22 cover the curved metal tubing, and a hand molded rubber pipe 23 extends from the tubing, covering the extension of the center handle bar 20. At the center of the circular handle bar 17, a bracket 24 is attached from underneath by a screw fastened to the handle bar 17. This bracket 24 anchors a metal ring 25, which is used to attach the shoulder strap snap latch 133, shown on FIG. 9C, for attaching a shoulder strap 123. As shown in FIGS. 9A–9C, the semicircular handle 17, center handle bar 20 and shoulder strap 123 provide a means for gripping and carrying the vacuum unit 1 during operation or transport. Following FIG. 2 from right to left the following parts are shown:

The motor cap 26 covers the internal brush holders 29 shown on FIG. 3. The motor cap 26 is bolted by two screws 28 and 28B onto the brush holder 29. The motor cap 26 is also partly covered and keeps the lint filter 30 in position (as more clearly shown on FIG. 3).

The motor 31 is bolted onto the upper die cast outer housing 32 through the brush holder unit 29 by two long screws 46 and 46B shown on FIG. 3. In the system of the present invention, the impeller housing 39 is preferably made of three parts: the upper outer housing 32, the extension spacer 33, and the lower housing 34. All three parts are grooved and tongued to establish a tight seal as they are bolted together by means of six external molded brackets 35. The extension spacer 33 is preferably formed of plastic fortified with glass fibers, but may also be composed of aluminum die cast metal. The inclusion of extension spacer allows the impeller housing 39 to accomodate a larger impeller which leads to an increase in air flow through the housing of approximately 20%.

A hose adapter 36 is bolted below the lower housing 34. This hose adapter 36 also supports a grille cover 62 (as shown on FIG. 3) which acts as a safety feature when the unit is used as a blower.

Figure 8B:
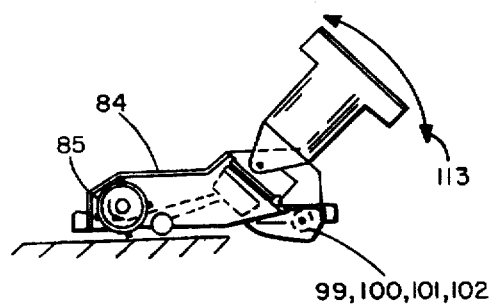
FIG. 8B is a sectional view of the retainer showing the retainer details.
Figure 8D:
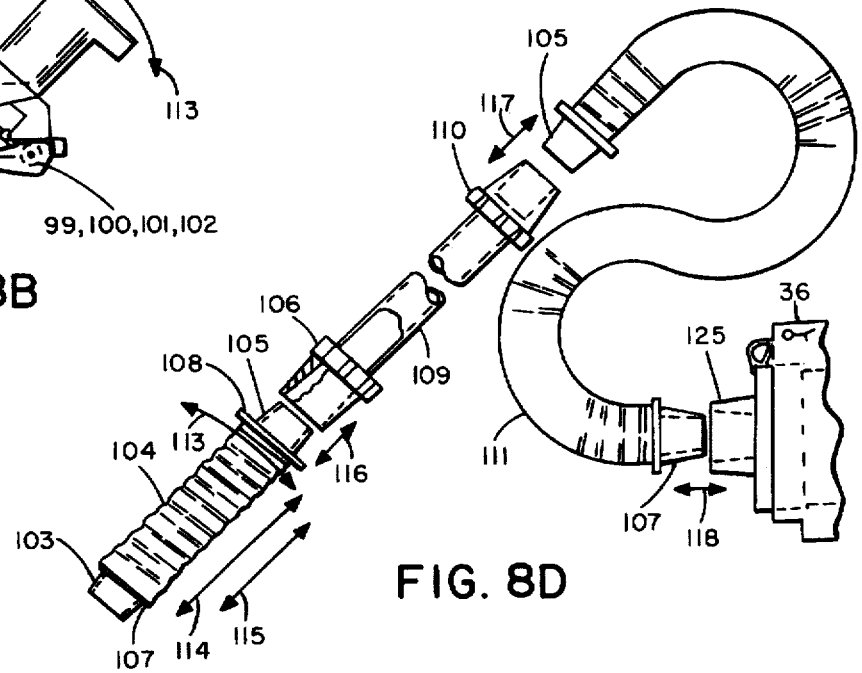
FIG. 8D illustrates the pipe coupling connections to the brush and vacuum unit.

The 4" hose end cap 66 (more clearly shown on FIG. 6A) and the 2½" hose reducer 125 (as shown in FIG. 8D) and the safety cap (not shown) each have an integrally molded, plastic finger 41. An extension 81 is attached at the end of finger 41, as shown on FIG. 6C. The extension 81 is inserted into the adapter slot 55, raising the microswitch roller 40, also shown on FIG. 6C, which actuates the microswitch 148 and electrically opens the motor circuit. The finger extension 81 flexes back behind the edge of the adapter slot 55 and anchors the pipes, acting as a coupling safety, yet enabling quick disconnection if needed.

FIG. 3 shows a sequential schematic view of all parts of the housing, motor assembly and the hose adapter. The motor cap 26 is held by two screws 28 and 28B retaining a metal filter 30, set in the recesses of the motor cap 26 and the brush holding unit 29, which keeps the motor lint free, thus keeping the fast running motor from choking and overheating. The brush holder 29 holds the brushes 42 and 42B. The motor shaft bearings 43 and 43B fit on the brush holding unit 29 and the top housing 32. The upper housing 32 and the motor 31, are joined to an electrical switch assembly cover 27. The motor stator 44, the motor rotor 45, and the threaded motor shaft 37, extend through the motor housing 31. The impeller 50 is screwed onto the threaded motor shaft 37. The housing spacer 33 increases the internal air volume of the impeller housing 39. See FIG. 4F. The hose adapter 36 is fastened to the lower die cast housing 34.

Figure 4A:
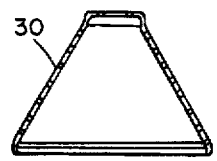
FIG. 4A is a section view of the bell-shaped lint filter.
Figure 4B:
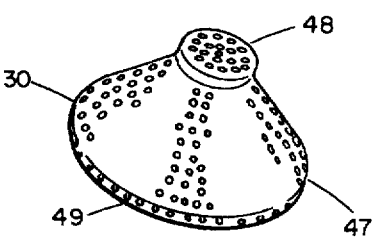
FIG. 4B is a perspective view of the bell-shaped lint filter.

FIG. 4B shows the metal lint filter 30, which comprises a centralized cone 47 terminated by a cylindrical cap 48 at the top and a cylindrical edge 49 at the bottom. The sectional view of FIG. 4A shows the inside of the filter. The filter 30 is preferably made in one piece, and is preferably constructed from a single sheet of perforated steel stock, but may also be constructed from a molded plastic mesh. The perforation size for the holes is approximately 0.07 inches diameter and perforation density is 113 holes per square inch. These values correspond to an open area of approximately 50%, and were chosen to allow a sufficient air flow volume to keep the motor cool for an extended period of time.

Figure 4C:
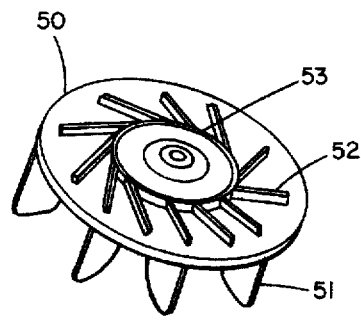
FIG. 4C is a perspective view of the turbo impeller.
Figure 4D:
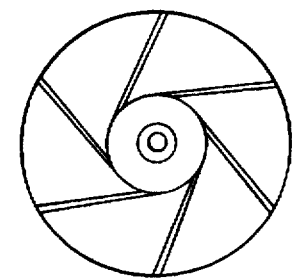
FIG. 4D is a front elevation of the turbo impeller.

FIGS. 4C and 4D show, in detail, the impeller 50. Attached to the front of the impeller are six front vanes 51, as shown on FIG. 4D. In a preferred embodiment, the six front vanes 51 are approximately 1½ inches high, and the impeller 50 is approximately 5 inches in diameter. The impeller 50 preferably rotates at approximately 10,000 rpm under one horsepower. The orientation of the vanes 51 is shown on FIG. 4D. As shown in FIG. 4C, twelve smaller vanes 52 are attached to the rear of the impeller 50. The twelve small vanes 52 act to create an air flow in order to prevent the impeller 50 from rubbing against the wall of the impeller housing 39. See FIG. 4F. A cylindrical edge 53 is integrally molded to the rear of the impeller 50. The cylindrical edge 53 joins the twelve small vanes 52. The cylindrical edge 53 also acts as a lint gate between the housing 39 and the motor rotor startup gap by lightly contacting the back of the impeller housing 39 during operation.

Figure 4E:
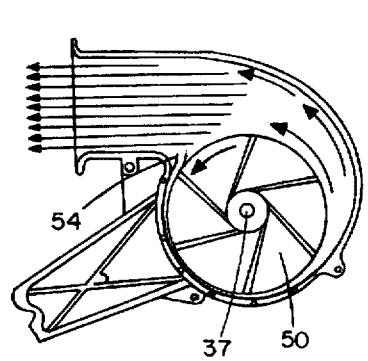
FIG. 4E is a section view of the impeller housing assembly, as well as the air flow transfer therein.
Figure 4F:
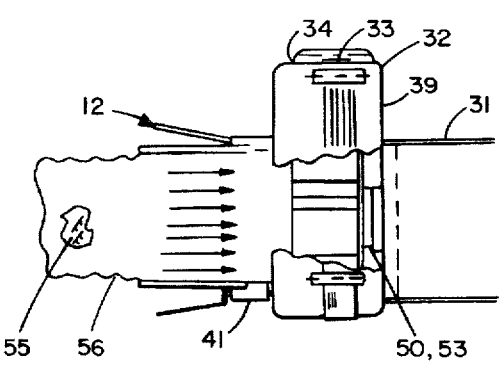
FIG. 4F is a cutaway view of the impeller housing assembly, as well as the air flow transfer therein.

FIG. 4E shows the turbine's centrifugal air flow input and output in detail. As the impeller 50 is rotationally driven by the motor shaft 37, the cutoff gap 54 creates the air intake pressure. In the preferred embodiment, the size of the cutoff gap is approximately 10% of the diameter of the impeller. FIG. 4F shows the impeller housing 39 and the cylindrical edge 53 of the impeller 50 on the impeller housing 39 and the motor assembly 31.

FIG. 5A shows the new clamping assembly in detail, which is used to clamp the exhaust pipe 61 to the impeller assembly 39. Clamps 57 and 58 are fastened together by bolting attachments 59 and 60, and 59B and 60B. FIG. 5B shows exhaust pipe 61 and the impeller housing assembly 39 held together by the clamp 57.

FIG. 6A shows the 4" flexible hose end cap 66 inserted into the hose adapter 36. The 2½" hose reducer 125 and the grilled saftey cover 62 are inserted into the hose adapter 36 in a similar manner. The hose end cap 66, 2½" hose reducer 125 and the safety cover 62 are retained on the hose adapter 36 by means of a rotating cam 63 having lever extensions 67. The cam 63 has a button 65 for manually lifting the cam 63. The cam 63 pivots about a shoulder screw 70, which is mounted on a base and may be held in place by a nut 71, flat washer 74 and conical spring washer 75 through the wall of the hose adapter 36. A latch 72 is affixed to the cam 63 and rotates as the cam 63 is rotated. Facing the cam 63, a slot 64 is formed in the wall of the hose adapter 36, which permits the latch 72 to rotate into a slot formed in the wall of the hose end cap 66 and hold the hose end cap 66 fast. See FIG. 6B. The latch 72 also lightly forces the back wall of the hose cap 66 against the hose adapter 36, thus limiting air flow leakage from the vacuum unit 1.

A ball and spring retainer mechanism 68 is installed in a threaded hole in the hose adapter 36 diametrically opposite the cam 63. When the hose cap 66 is installed on the hose adapter 36, the ball is urged against the hose cap 66 by the spring. The retainer mechanism 68 assits the operator in correctly positioning the hose cap 66 during installation. When the latch 72 has been disengaged, the retainer mechanism 68 retains the hose cap 66 in place, and a light pull will cause the hose cap 66 to be removed completely from the hose adapter 36. The 2½" hose reducer 125 and the grilled saftey cover 62 are held in place and removed in a similar manner.

FIG. 7 shows the wand and the cleaning tools for the 2½" extension system. FIG. 7 also shows the collection bag 119, and the 4" flexible hose 56.

FIG. 8 shows several views of the rug vacuum attachment and its connection to the portable vacuum unit 1.

FIG. 8A is a top view of the motorized, rotating brush carrier 84. The cross sections (FIG. 8B) show a center section of this brush carrier 84 and the means of connecting the flexible hose 111 shown on FIG. 8D. The following is a description of FIG. 8 with its views.

The brush carrier 84, which is preferably formed of plastic, supports a rotating brush 85 with a helical bristle array, further supported by two end bearings. The brush is rotating counter clockwise and driven with a high speed motor 86 and a flat belt 87, while an integrally molded plastic baffle (not shown) isolates the motor 86 from dust. Also, another baffle 88, FIG. 8C, underneath confines the vacuum dust. The frame also has a large aperture 89 molded on a 45 degree slant for receiving a flexible tube 104 shown on FIG. 8D.

FIG. 8C shows a larger view of this connection. It consists of two parts: a square bracket 90 with a large bore and four tap holes set on the inside of the frame of the brush carrier 84, and a sheet metal bracket 91, shown on FIG. 8E. This bracket 91 has four clearance holes which match the aluminum part with the tap holes. The plastic frame also has four corresponding clearance holes, four screws 92, 93, 94, and 95 fastening all three parts together as shown. The bracket 91 has two welded pins 96 and 97 in line, as shown on FIG. 8E, used as a pivot for sheet metal part 98 shown on FIG. 8F. The frame is mounted on four wheels 99, 100, 101 and 102.

The transfer tube assembly is shown on FIG. 8D. It consists of two standard tube couplings 103 and 105, forced into the inside of a flexible tube 104. The tube 104 is compressed between brackets 91 and 98 at assembly. Bracket 98 pivots about bracket 91 on pins 96 and 97. The tube coupling 103 is inserted into aperture 89. The two flanges 107 and 108 retain the spring tension of the flexible hose 104. The upper tube coupling 105 inserts into the coupling 106. The pipe 109 is preferably composed of clear polycarbonate tubing, about 2½ feet long to which two couplings 106 and 110 are bonded. The pipe 109 is preferably rigid, which allows easy control of the carpet unit. The coupling 110 allows insertion of another tube coupling 105 to connect a flexible hose 111, terminated by another tube coupling 105, which fits the 2½" hose reducer 125 which itself fits and latches onto the hose adapter 36.

Such an arrangement allows rapid assembly and disassembly for compact packaging. The arrow 13 shows the direction of rotation of the pipe 104. Arrows 114 and 15 show the compression of the pipe 104. When assembled, arrows 116, 117, and 118 show the coupling motion between the members.

Figure 8E:
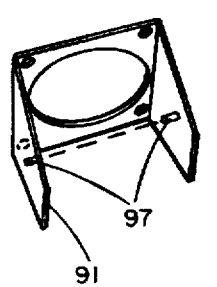
FIG. 8E is a perspective view of the hose retainer.
Figure 8F:
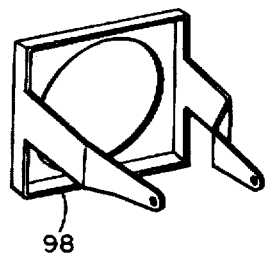
FIG. 8F is a perspective view of the hose retainer coupling.

FIG. 8E shows bracket 91 in detail, and FIG. 8F shows bracket 98 in detail.

FIG. 9A shows two modes of usage for the invention. On the left side, it shows the operator handling the device with both hands, equipped with the bag 119, which is anchored on the exhaust pipe 61 at the bottom and held by the strap 123. The large flexible 4" hose 56 vacuums multiple types of heavy debris such as bolts, cans, paper, and cloth which are deposited into the bag 119.

In FIG. 9B, another utilization is shown where the operator, equipped with a 2½" diameter flexible hose 124, which is fitted on the hose adapter 125 and latched to the hose adapter 36. The operator supports a flexible hose 124 and a series of rigid pipes 126. This configuration can be built up to an adjustable height of 30 feet, as needed, and at the end an elbow 127 helps in cleaning the overhanging debris. Also, a set of tools better shown of FIG. 7 can be inserted to clean hard to reach areas.

FIG. 9C shows the details of the bag 119, with the shoulder strap 123. It also shows the handle bar 17 and how the strap 123 is anchored to allow easy operation. The left end of the strap 123 has a hooped latch 133 which is anchored to the hole 134 at the right end of the bag 119. The strap 123 has an adjustable belt 135 with a similar looped latch 133 which is anchored to the ring 125 on the handle bar 17.

Figure 10:
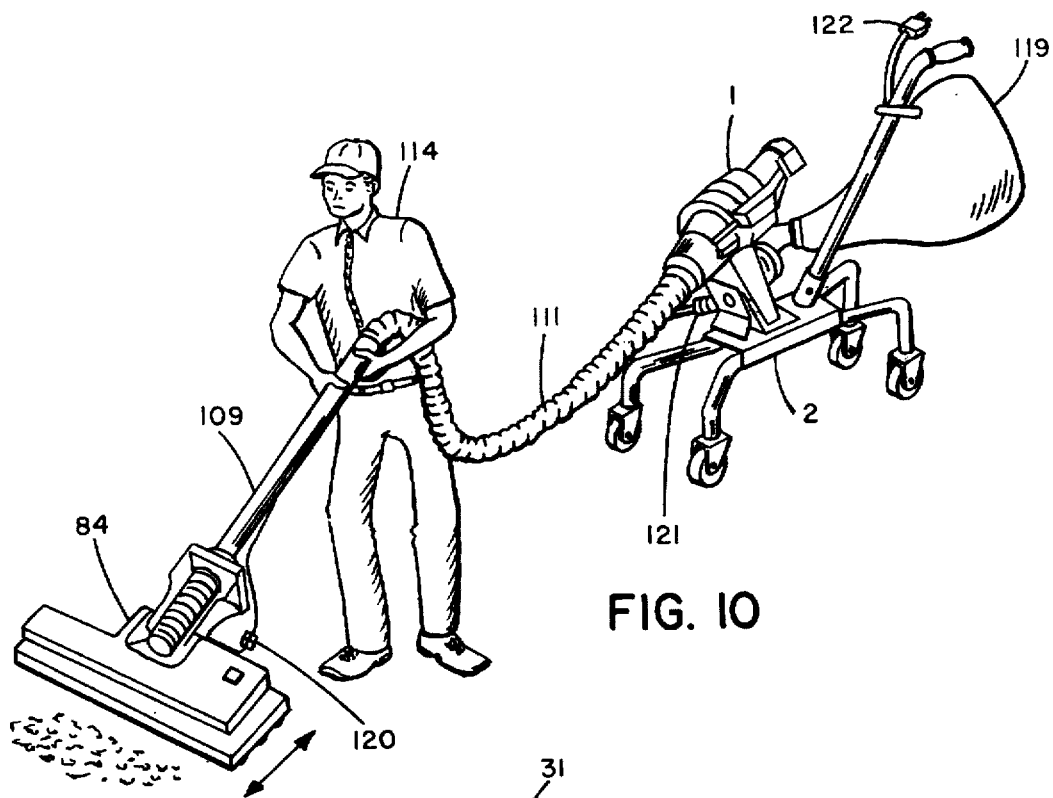
FIG. 10 shows the utilization of the rug cleaner in tandem with the movable vacuum unit arrangement.

FIG. 10 shows a third mode of usage of the device. The brush carrier 84 is actuated by the operator through the pipe 109 which is connected to the vacuum unit 1 through the flexible hose 111. The vacuumed debris is then transferred to the zippered detachable bag 119.

Figure 11:
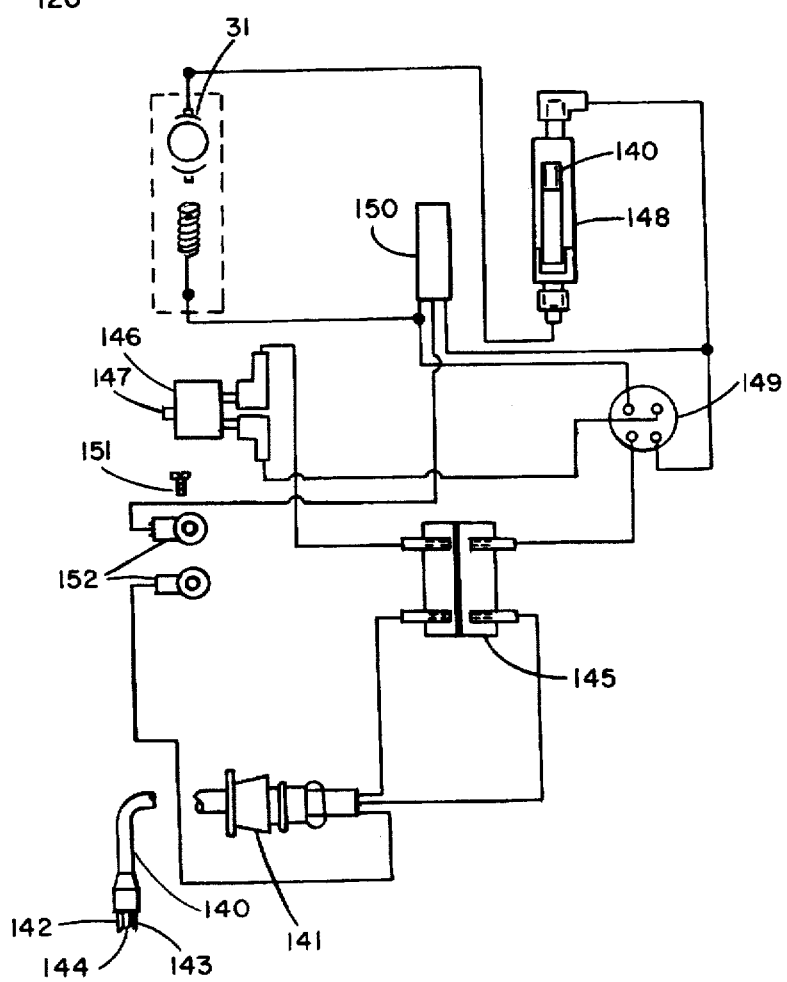
FIG. 11 is a wiring diagram of the electrical circuit used in the preferred embodiment.
Figure 12:
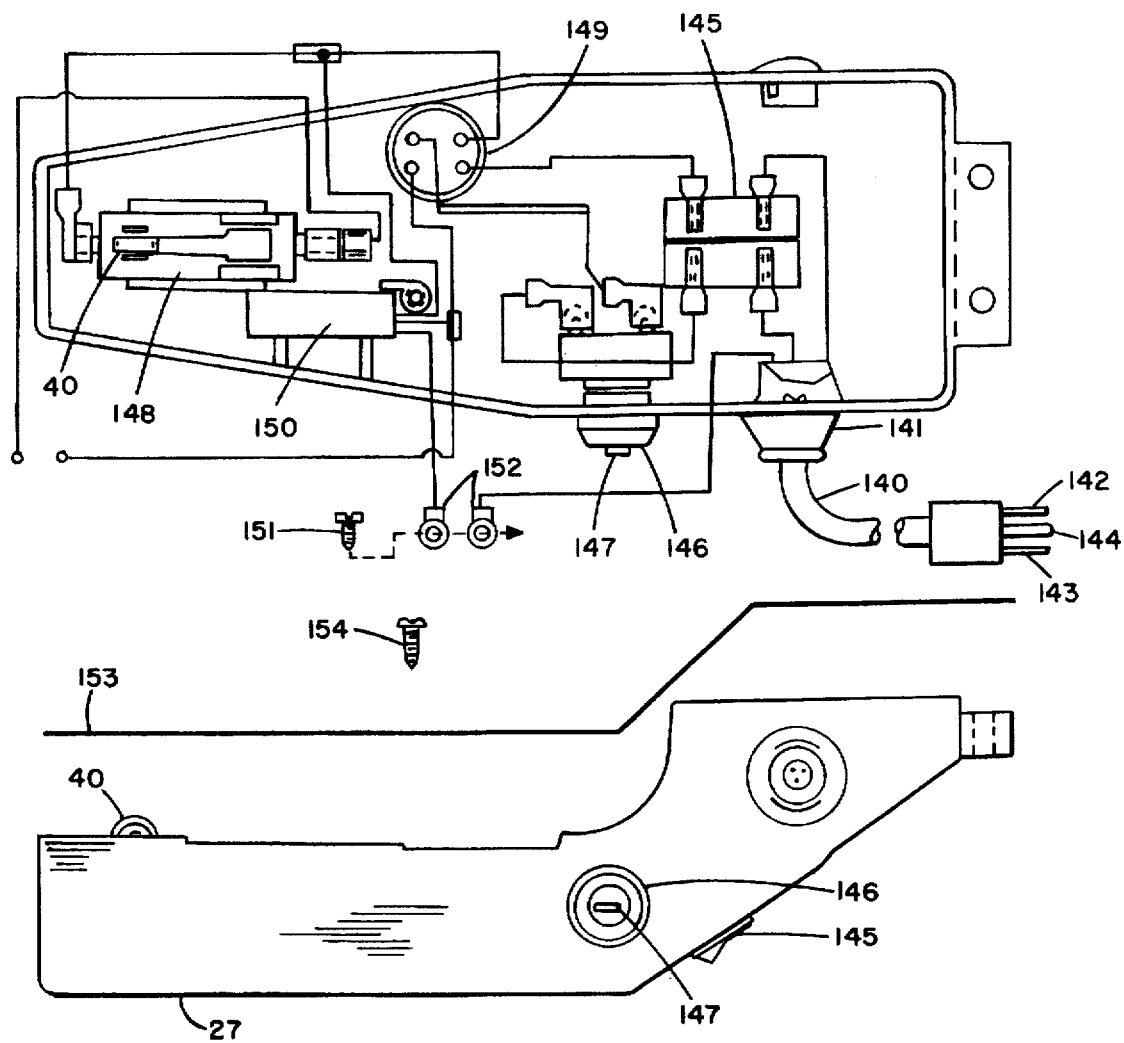
FIG. 12 is a plan view and side elevation of the electrical control assembly.

FIG. 11 and FIG. 12 show the control circuit and the control component assembly. In reference to FIG. 12, the circuit consists of a group of components, all assembled within the cover These components are the AC input, and the insulation cord 140, which is plugged into a line supply voltage, set for either 110V or 220V AC. The cord is passed through the wall of the cover 27. It is retained by a stress relief bushing 141 which sets the cord in position and allows a safe amount of pulling force. The open end wires 142 and 143 provide the AC two phase power and the third green wound wire 144 is neutral.

A commercially available rocker-type switch 145 is mounted through the top wall of the cover 27. The rocker switch 145 establishes the on-off manual control function of the circuit. The switch 145 preferably has a lamp which indicates whether the power is on, providing a safety feature to alert one that the power is on even if the motor is not running. A circuit breaker 146 limits the current through the circuit allowing for safe electrical power usage. It has a reset button 147 which allows manual resetting.

A microswitch 148, with a roller actuator 40 is used to interrupt the circuit for safety, either while the motor is on or off. This microswitch 148 is activated by either one of the three finger latches described above. If either the 4" pipe, the 2½" pipe or the grilled cover is inserted into the hose adapter 36 the microswitch is electronically opened and will allow the motor to run. If any of three components is not inserted, the microswitch is closed and the motor is inoperative so that, for safety's sake, the operator cannot reach a running impeller.

An electrical filtering design with an inductor 149 and a capacitor 150 are also inserted into the circuit to control the radio frequency interference (RFI) and the electro magnetic interference (EMI) caused by the motor's electric and magnetic fields and thus prevent disturbance to other electrical equipment. The circuit ground and the cord ground are commonly attached on the die cast motor housing 31 by two lugs 152 and a screw 151.

An insulating mylar sheet 153 is attached to the cover 27 tap hole at the bottom by a screw 154. This insulates all components and wires from the metal frame to which the cover assembly 27 is attached.

What is claimed is:

1. An industrial vacuum system for the collection of large debris in industrial settings, said vacuum capable of being mounted on a wheeled frame and being carried manually, comprising:
   a vacuum unit having an impeller housing,
   an impeller disposed within said impeller housing,
   a motor housing attached to said impeller housing,
   a motor having a motor shaft, said motor disposed within said motor housing, wherein said motor shaft is rotationally connected to said impeller;
   means, disposed within said motor housing, for preventing debris from entering said motor;
   means, disposed upon said impeller, for preventing debris from entering said motor;
   means for detachably attaching said vacuum unit to said wheeled frame; and
   means for gripping and carrying said vacuum unit.

2. An industrial vacuum system according to claim 1, wherein
   said impeller has a forward side and a reverse side, and
   said means disposed upon said impeller for preventing dust from entering said motor housing comprises a cylindrical edge disposed on the reverse side of and concentrically with said impeller.

3. An industrial vacuum according to claim 2, wherein said cylindrical edge is disposed concentrically with said impeller.

4. An industrial vacuum system according to claim 1, wherein said impeller has six large vanes disposed on the forward side thereof and twelve smaller vanes disposed on the reverse side thereof.

5. An industrial vacuum according to claim 4, wherein said smaller vanes have an interior end and an exterior end and said cylindrical edge adjoins the interior ends of said smaller vanes.

6. An industrial vacuum system according to claim 4, wherein said means disposed within said motor housing for preventing dust from entering said motor housing comprises a lint filter.

7. An industrial vacuum system according to claim 6, wherein said lint filter is formed of perforated steel material.

8. An industrial vacuum system according to claim 7, wherein said perforated material has a perforation size of approximately 0.07 inches diameter.

9. An industrial vacuum system according to claim 7, wherein said perforated material has a perforation density of approximately 113 perforations per square inch.

10. An industrial vacuum system according to claim 6, wherein said lint filter is formed in the shape of a conic section having a narrow end and a wide end, the ends of said lint filter having cylindrical flanges formed thereon, and the narrow end of said lint filter having a circular portion disposed on the cylindrical flange.

11. An industrial vacuum system according to claim 10, wherein:
    said motor housing has a motor cap and a brush holder; and
    said lint filter is mountable within said motor housing by disposing said lint filter between said motor cap and said brush holder.

12. An industrial vacuum system according to claim 1, wherein said means for detachably attaching said vacuum unit to said wheeled carriage comprises:
    a frame extension attached to said vacuum unit, said frame extension having a predefined shape and a hole disposed therein;
    a metal bracket disposed on the wheeled frame, said metal bracket being shaped to conform to the predefined shape of said frame extension; and
    a threaded bolt attached to said metal bracket;
    wherein said threaded bolt engages the hole disposed in said frame extension when said frame extension is mounted on said metal bracket; and
    said metal bracket engages said frame extension to prevent said frame extension from rotating about said threaded bolt when said frame extension is mounted on said metal bracket.

13. The industrial vacuum system according to claim 12, wherein said means for detachably attaching said vacuum unit to said wheeled carriage further comprises a handle affixed to the wheeled frame.

14. An industrial vacuum system according to claim 1, wherein said means for gripping and carrying said vacuum unit comprises:
    a semicircular handlebar attached externally to said vacuum unit, said handlebar forming a semicircular arc around said vacuum unit; and
    a handle having an end, the end of said handle being attached at the center of the arc of said semicircular handlebar.

15. An industrial vacuum system according to claim 1, wherein said means disposed within said motor housing for preventing dust from entering said motor housing comprises a lint filter, wherein
    said lint filter is formed of perforated steel material;
    said lint filter is formed in the shape of a conic section having a narrow end and a wide end;
    the ends of said lint filter have cylindrical flanges formed thereon;
    the narrow end of said lint filter has a circular portion disposed on the cylindrical flange;
    said motor housing has a motor cap and a brush holder; and
    said lint filter is mountable within said motor housing by disposing said lint filter between said motor cap and said brush holder.

16. An industrial vacuum system according to claim 1, wherein said perforated material has a perforation size of approximately 0.07 inches in diameter.

17. An industrial vacuum system according to claim 15, wherein said perforated material has a perforation density of approximately 113 perforations per square inch.

18. An industrial vacuum system according to claim 1, wherein said impeller has a forward side and a reverse side, and said means disposed upon said impeller for preventing dust from entering said motor housing comprises a cylindrical edge disposed on the reverse side of and concentrically with said impeller.

19. An industrial vacuum system according to claim 1, wherein the minimum radial distance between said impeller and said impeller housing is less than 1/10th the diameter of said impeller.

20. An industrial vacuum system according to claim 1, further comprising:

an input hose; and means for connecting said input hose to said impeller housing.

21. An industrial vacuum system according to claim 20, wherein said means for connecting said input hose to said impeller housing comprises:

a hub rotationally attached to said impeller housing;

means for rotating said hub; and a latch attached to said hub;

an end cap attached to said input hose, said end cap having a radial slot formed therein; and means, disposed on said impeller housing opposite said rotating hub, for retaining said end cap after said latch has been disengaged;

wherein said impeller housing has a radial slot formed therein through which said latch is rotatable to engage said radial slot in said end cap.

22. An industrial vacuum system according to claim 1, wherein said impeller housing comprises:

a top housing;

a housing extension spacer; and a bottom housing;

said vacuum system further comprising:

a plurality of large vanes disposed on the forward side of said impeller;

a plurality of smaller vanes disposed on the reverse side of said impeller;

means, disposed within said motor housing, for preventing dust from entering said motor housing; and means, disposed upon said impeller, for preventing dust from entering said motor housing, wherein:

the minimum radial distance between said impeller and said impeller housing is less than 1/10th the diameter of said impeller;

said impeller has a forward side and a reverse side;

said means disposed upon said impeller for preventing dust from entering said motor housing comprises a cylindrical edge disposed on the reverse side of and concentrically with said impeller;

said smaller vanes have an interior end and an exterior end; and said cylindrical edge adjoins the interior ends of said smaller vanes.

23. An industrial vacuum system according to claim 22, said impeller having six large vanes disposed on the forward side thereof and twelve smaller vanes disposed on the reverse side thereof.

24. An industrial vacuum system for the collection of large debris in industrial settings, said vacuum capable of being mounted on a wheeled frame and being carried manually, comprising:

a vacuum unit having an impeller housing, an impeller disposed within said impeller housing, a motor housing attached to said impeller housing, a motor having a motor shaft, said motor disposed within said motor housing, wherein said motor shaft is rotationally connected to said impeller;

means for detachably attaching said vacuum unit to said wheeled frame, said means comprising:

a frame extension attached to said vacuum unit, said frame extension having a predefined shape and a hole disposed therein;

a metal bracket disposed on the wheeled frame, said metal bracket being shaped to conform to the predefined shape of said frame extension; and a threaded bolt attached to said metal bracket, wherein said threaded bolt engages the hole disposed in said frame extension when said frame extension is mounted on said metal bracket and said metal bracket engages said frame extension to prevent said frame extension from rotating about said threaded bolt when said frame extension is mounted on said metal bracket; and means for gripping and carrying said vacuum unit.

25. An industrial vacuum system for the collection of large debris in industrial settings, said vacuum capable of being mounted on a wheeled frame and being carried manually, comprising:

a vacuum unit having an impeller housing, an impeller disposed within said impeller housing, a motor housing attached to said impeller housing, a motor having a motor shaft, said motor disposed within said motor housing, wherein said motor shaft is rotationally connected to said impeller;

means for detachably attaching said vacuum unit to said wheeled frame; and means for gripping and carrying said vacuum unit, said means for gripping and carrying said vaccum unit comprising:

a semicircular handlebar attached externally to said vacuum unit, said handlebar forming a semicircular arc around said vacuum unit; and a handle having an end, the end of said handle being attached at the center of the arc of said semicircular handlebar.

26. An industrial vacuum system for the collection of large debris in industrial settings, said vacuum capable of being mounted on a wheeled frame and being carried manually, comprising:

a vacuum unit having an impeller housing, an impeller disposed within said impeller housing, a motor housing attached to said impeller housing, a motor having a motor shaft, said motor disposed within said motor housing, wherein said motor shaft is rotationally connected to said impeller;

an input hose;

means for connecting said input hose to said impeller housing;

means for detachably attaching said vacuum unit to said wheeled frame; and means for gripping and carrying said vacuum unit.

27. An industrial vacuum system according to claim 26, wherein said means for connecting said input hose to said impeller housing comprises:
- a hub rotationally attached to said impeller housing;
- means for rotating said hub; and
- a latch attached to said hub;
- an end cap attached to said input hose, said end cap having a radial slot formed therein; and
- means, disposed on said impeller housing opposite said rotating hub, for retaining said end cap after said latch has been disengaged;
- wherein said impeller housing has a radial slot formed therein through which said latch is rotatable to engage said radial slot in said end cap.

28. An industrial vacuum system for the collection of large debris in industrial settings, said vacuum capable of being mounted on a wheeled frame and being carried manually, comprising:
- a vacuum unit having an impeller housing, said impeller housing including a top housing, a housing extension spacer and a bottom housing,
- an impeller disposed within said impeller housing, said impeller having a forward side and a reverse side;
- a motor housing attached to said impeller housing,
- a motor having a motor shaft, said motor disposed within said motor housing, wherein said motor shaft is rotationally connected to said impeller;
- a plurality of large vanes disposed on the forward side of said impeller;
- a plurality of smaller vanes disposed on the reverse side of said impeller, said smaller vanes having an interior end and an exterior end;
- means, disposed within said motor housing, for preventing debris from entering said motor;
- means, disposed upon said impeller, for preventing debris from entering said motor, wherein the minimum radial distance between said impeller and said impeller housing is less than 1/10th the diameter of said impeller;
- said means disposed upon said impeller for preventing debris from entering said motor comprising a cylindrical edge disposed on the reverse side of and concentrically with said impeller, said cylindrical edge adjoining the interior ends of said smaller vanes;
- means for detachably attaching said vacuum unit to said wheeled frame; and
- means for gripping and carrying said vacuum unit.

29. An industrial vacuum system according to claim 28, said impeller having six large vanes disposed on the forward side thereof and twelve smaller vanes disposed on the reverse side thereof.

30. The industrial vacuum system according to claim 24, wherein said means for detachably attaching said vacuum unit to said wheeled frame further comprises a handle affixed to the wheeled frame.

* * * * *